(12) United States Patent
Xiong et al.

(10) Patent No.: US 10,778,982 B2
(45) Date of Patent: Sep. 15, 2020

(54) METHOD AND SYSTEM FOR BIT RATE CONTROL AND VERSION SELECTION FOR DYNAMIC ADAPTIVE VIDEO STREAMING MEDIA

(71) Applicant: SHANGHAI JIAO TONG UNIVERSITY, Shanghai (CN)

(72) Inventors: Hongkai Xiong, Shanghai (CN); Chenglin Li, Shanghai (CN)

( * ) Notice: Subject to any disclaimer, the term of this patent is extended or adjusted under 35 U.S.C. 154(b) by 63 days.

(21) Appl. No.: 16/297,717

(22) Filed: Mar. 11, 2019

(65) Prior Publication Data
US 2019/0208215 A1  Jul. 4, 2019

Related U.S. Application Data

(63) Continuation of application No. PCT/CN2017/106444, filed on Oct. 17, 2017.

(30) Foreign Application Priority Data

Nov. 16, 2016  (CN) .......................... 2016 1 1032465

(51) Int. Cl.
*H04N 19/147* (2014.01)
*H04N 21/2343* (2011.01)
(Continued)

(52) U.S. Cl.
CPC ..... *H04N 19/147* (2014.11); *H04N 21/23439* (2013.01); *H04N 21/234363* (2013.01);
(Continued)

(58) Field of Classification Search
CPC .... H04N 19/147; H04N 19/56; H04N 19/103; H04N 19/98; H04N 19/124;
(Continued)

(56) References Cited

U.S. PATENT DOCUMENTS

| 2003/0144667 A1 | 7/2003 | Enayati |
| 2007/0153916 A1* | 7/2007 | Demircin ......... H04N 21/23805 375/240.26 |

(Continued)

FOREIGN PATENT DOCUMENTS

| CN | 103702139 A | 4/2014 |
| CN | 105979274 A | 9/2016 |
| CN | 106713956 A | 5/2017 |

OTHER PUBLICATIONS

Internation Search Report of PCT/CN2017/106444, dated Jan. 4, 2018.

*Primary Examiner* — Allen C Wong
(74) *Attorney, Agent, or Firm* — Andrew C. Cheng

(57) ABSTRACT

The disclosure provides a method and system for encoding bit rate control and version selection for a dynamic adaptive video streaming media. The method adopts a dynamic adaptive streaming media encoding technology to encode each original video into a plurality of versions with different bit rates at a server and determines video version subsets to be encoded by the original videos and specific encoding parameters of each video version by taking an encoding complexity-bit rate-distortion model for different original video contents, constraints on an encoding bit rate and a computing resource of the video server, network connection conditions of different users and a video-on-demand probability distribution into consideration, and finally, the video server outputs an optimal video version set through encoding, so as to maximize the overall quality of videos watched by users.

9 Claims, 4 Drawing Sheets

(51) Int. Cl.
  *H04N 21/2662* (2011.01)
  *H04N 21/845* (2011.01)
  *H04N 19/98* (2014.01)
  *H04N 19/124* (2014.01)
  *H04N 19/56* (2014.01)
  *H04N 19/103* (2014.01)

(52) U.S. Cl.
  CPC ..... *H04N 21/2662* (2013.01); *H04N 21/8456* (2013.01); *H04N 19/103* (2014.11); *H04N 19/124* (2014.11); *H04N 19/56* (2014.11); *H04N 19/98* (2014.11)

(58) Field of Classification Search
  CPC ......... H04N 21/23439; H04N 21/8456; H04N 21/234363; H04N 21/2662; H04N 21/2405
  USPC ..................................................... 375/240.12
  See application file for complete search history.

(56) References Cited

U.S. PATENT DOCUMENTS

| | | | |
|---|---|---|---|
| 2010/0091841 A1* | 4/2010 | Ishtiaq | ................ H04N 19/147 375/240.02 |
| 2014/0223502 A1 | 8/2014 | Doblmaier et al. | |
| 2016/0044080 A1* | 2/2016 | DuBreuil | ........... H04N 21/6405 709/219 |

* cited by examiner

METHOD AND SYSTEM FOR BIT RATE CONTROL AND VERSION SELECTION FOR DYNAMIC ADAPTIVE VIDEO STREAMING MEDIA

CROSS-REFERENCE TO RELATED APPLICATIONS

This application is a continuation of International Patent Application No. PCT/CN2017/106444 with a filing date of Oct. 17, 2017, designating the United States, now pending, and further claims priority to Chinese Patent Application No. 201611032465.0 with a filing date of Nov. 16, 2016. The content of the aforementioned applications, including any intervening amendments thereto, are incorporated herein by reference.

TECHNICAL FIELD

The disclosure relates to a method and a system in the technical field of data communication, and more specifically to a method and system for bit rate control and version selection for a dynamic adaptive video streaming media.

BACKGROUND OF THE PRESENT INVENTION

With the rapid increase of mobile data traffic and the increasing popularization of intelligent terminal devices, a wireless video streaming media technology represented by mobile video service has been used more and more widely in recent years. In the meanwhile, mobile users present a more complicated heterogeneous property in the aspects of used mobile terminal devices, video-on-demand contents, network connectivity and the like, thereby greatly increasing the complexity and difficulty of video streaming media services. The dynamic adaptive streaming media technology can provide different versions of the same video content for users to improve user's satisfaction in video watching in a heterogeneous network. Herein, each video version is encoded using specified bit rate and/or resolution, such that each user can determine and download the most appreciate video version according to own video-on-demand needs and network conditions.

On the one hand, a single-bit rate video encoding technology requires consuming extremely high encoding complexity to achieve higher video compression performance. For an encoding server performing the dynamic adaptive streaming media technology, it is often limited by its own physical power consumption so that excess video encoding versions are obtained by encoding to be adapted to needs of different users, and thus it is needed to reasonably allocate limited computation resources to different versions of each video. On the other hand, due to constraints on a server storage space and constraints on a bottleneck bandwidth in network transmission, a sum of bit rates of different versions of all the videos is also limited, and thus it is also needed to reasonably allocate limited bit rate resources to different versions of each video.

Through retrieval of the existing technologies, we find that a paper entitled with "Optimal selection of adaptive streaming representations" is disclosed by Toni et al. in ACM Transactions on Multimedia Computing, Communications, and Applications in February, 2015) and a paper entitled with "Transcoding live adaptive video streams at a massive scale in the cloud" is disclosed by R. Aparicio-Pardo et al. in the Proceedings of ACM Multimedia Systems Conference in March 2015, pp. 49-60. These two papers respectively studied how the server optimally selects an encoding bit rate and resolution for each video version under the condition that the encoding bit rate and the power consumption are restricted. However, the main approach of the above work is to model an optimal version selection problem into an extremely complicated integer linear programming (ILP) problem, and an optimal video encoding version is obtained by solving this ILP problem. The complexity of this approach increases exponentially with the scale of the system, and thus it is needed to consume extremely high complexity and computation resources, thereby taking up the computation resources for video encoding by the server, with great limitation. On the other hand, the above work assumes that the different video versions of each video have been obtained by pre-encoding, its final objective is to select an optimal version subset from these known versions, and this assumption is failed in an actual system. For example, all the video streams transmit bit rates to the users after undergoing real-time encoding, and thus there is no enough time to pre-encode all the videos.

SUMMARY OF PRESENT INVENTION

Aiming at the defects of the existing technology, the object of the disclosure is to provide a method and system for bit rate control and version selection for a dynamic adaptive video streaming media.

To achieve the above object, the technical solution of the disclosure is as follows.

In one aspect, a method for encoding bit rate control and version selection for a dynamic adaptive streaming media is provided. The method adopts a dynamic adaptive streaming media encoding technology to encode each original video into a plurality of versions with different bit rates at a server and determines each original video version subset to be encoded by each original video and specific encoding parameters of each video version by taking an encoding complexity-bit rate-distortion model for different original video contents, constraints on an encoding bit rate and a computing resource of the server, network connection conditions (such as user wideband resources) of different users and a video-on-demand probability distribution into consideration, and the server finally outputs an optimal video version set through encoding, so as to maximize the overall quality of videos watched by users.

Specifically, the method for bit rate control and version selection for the dynamic adaptive video streaming media includes the following steps:

Step 1: video model extraction

Extracting first several frames of each original video to obtain an encoding complexity-bit rate-distortion model for each original video;

Step 2: bit rate control and version selection establishing an optimization problem of encoding bit rate control and version selection for the dynamic adaptive video streaming media according to a full set consisting of different versions of each video obtained by encoding at the server, the encoding complexity-bit rate-distortion model for each original video obtained in Step 1, constraints on an encoding bit rate and a computing resource of the server, network connection conditions of users and a video-on-demand probability distribution, and obtaining an encoding parameter of an optimal version of each video by using a bit rate control and version selection method for an optimal version set;

Step 3: video version encoding encoding each original video into a plurality of video versions with different bit rates by using a dynamic adaptive streaming media encoding technology and adopting the encoding parameter of each optimal version of each video obtained in Step 2, and outputting to obtain an optimal video version set.

Preferably, in Step 1, the number of the first several frames is any positive integer that is greater than two.

Preferably, in Step 1, the original videos present different encoding complexity-bit rate-distortion performances due to different contents.

Preferably, in Step 1, the encoding complexity-bit rate-distortion model expresses an encoding complexity, a bit rate and a distortion as a function of specific encoding parameters.

Preferably, in Step 2, the optimization problem of encoding bit rate control and version selection for the dynamic adaptive video streaming media is obtained by combining a full set consisting of different versions of each video obtained by encoding at the server, the encoding complexity-bit rate-distortion model for each original video obtained in Step 1, constraints on an encoding bit rate and a computing resource of the server, network connection conditions of users and a video-on-demand probability distribution and using a network utility maximization modelling method.

More preferably, the establishing an optimization problem of encoding bit rate control and version selection for a dynamic adaptive video streaming media includes:
optimization objective:

$$\max_{A \subseteq V} D(A) = \sum_{u \in U} \overline{D}_u(A),$$

constraints:

$$\sum_{f=1}^{F} \sum_{m=1}^{M} 1|_{u_{f,m} \in A} \cdot R_f(\lambda_m, Q_m) \leq R_{max},$$

$$\sum_{f=1}^{F} \sum_{m=1}^{M} 1|_{u_{f,m} \in A} \cdot C_f(\lambda_m, Q_m) \leq C_{max},$$

wherein, $\mathcal{F} = \{1, 2, \ldots, F\}$ represents a video file set; $\mathcal{M} = \{1, 2, \ldots, M\}$ represents video version set; $U = \{1, 2, \ldots, U\}$ represents a user set; F, M, U are any positive integers greater than 2; $\lambda_m$ denotes a search range of a video version m in motion estimation when encoding; $Q_m$ denotes a quantization step size of the video version m in quantization when encoding; $R_f(\lambda_m, Q_m)$ denotes an encoding bit rate of the M-th video version of the video file f; $C_f(\lambda_m, Q_m)$ denotes the encoding complexity of the M-th video version of the video file f; a basis set $V = \{v_{f,m} | \forall f 531 \mathcal{F}, \forall m \in \mathcal{M}\}$ is defined to denote the full set consisting of different versions of each video obtained by encoding at the server, wherein an element $v_{f,m}$ denotes the server encodes and outputs the $m$-th video version of the video file f; for each user $U \in \mathcal{U}$, a set of all the versions of all the videos downloaded through its link bandwidth $B_u$ is denoted as $\Omega_u = \{v_{f,m} \in V | R_f(\lambda_m, Q_m) \leq B_u, \forall f \in \mathcal{F}, \forall m \in \mathcal{M}\}$;

a variable is optimized: $\mathcal{A}$ represents a set consisting of the actually encoded and outputted versions of all the videos; specifically, an element $v_{f,m} \in \mathcal{A}$ represents that the $m$-th video version of the video file f is encoded and outputted by the server;

an objective is optimized: a sum $D(\mathcal{A}) = \Sigma_{u \in U} \overline{D}_u(\mathcal{A})$ of expected video distortion reductions of all the users is maximized, wherein a basis set V of different versions of each original video obtained by encoding at the server is the basis set of the optimization problem; when a user requests the video file f, a highest-bit-rate version of this video is selected from a set $\mathcal{A} \cap \Omega_u$ to be watched. Thus, given that the probability of user U requesting video file f is $P_{u,f}$, $\overline{D}_u(\mathcal{A})$ is then denoted as the expected video distortion reduction when user U watches the video representations from the actual output video representation set encoded by the server $\mathcal{A}$, namely, $$\overline{D}_u(A) = \sum_{f=1}^{F} \sum_{m=1}^{M} \left[ \prod_{j=1}^{m-1} (1 - 1|u_{f,f} \in (A \cap \Omega_u)) \right] \cdot$$

$$1|u_{f,m} \in (A \cap \Omega_u) \cdot P_{u,f} \cdot [D_{max} - D_f(\lambda_m, Q_m)]$$

in the formula, a value of an exponential function $1|u_{f,j} \in (A \cap \Omega_u)$ is 1 when $u_{f,j} \in (A \cap \Omega_u)$, and is 0 when $u_{f,j} \notin (A \cap \Omega_u)$; $D_{max}$ represents a maximum distortion constant when a video cannot be decoded; $D_f(\lambda_m, Q_m)$ represents encoding distortion of the M-th video version of the video file f; $D_{max} - D_f(\lambda_m, Q_m)$ represents a video distortion reduction when the user successfully decodes the M-th video version of the video file f;

the constraint conditions are a server's encoding bit rate constraint condition, namely, it is required that a sum of bit rates of all video versions does not exceed a maximum bit rate resource $R_{max}$ of the server; and a server's computation constraint condition, namely, it is required that a sum of encoding complexity of all the video versions does not exceed a maximum computation resource $C_{max}$ of the server.

Preferably, in Step 2, the bit rate control and version selection method for the optimal version set adopts a high-cost-benefit greedy algorithm with polynomial time complexity and high approximate optimization performance when determining encoding parameters of optimal versions for each original video so as to rapidly and efficiently achieve the bit rate control and version selection of the optimal version of each original video.

More preferably, the bit rate control and version selection method for the optimal version set includes the following steps:

(1) initialization: setting an initial local optimal solution set as an empty set, an initial search set as a full set of different versions of each video obtained by encoding at the server, and an initial search step count as 1;

(2) iterative search: searching over the remaining search set for an element that maximizes a weighted sum of the ratio of a boundary increment to bit rate cost and a ratio of the boundary increment to complexity cost according to the existing local optimal solution set, wherein the remaining search set is a complement set of the local optimal solution set as to the search set, and an element in the remaining search set corresponds to a certain bit rate version obtained by encoding a certain video;

(3) updating: if the constraints on encoding bit rate and computation resource at the server are still satisfied after the element searched in step (2) is added, then adding this element into the local optimal solution set, and keeping the search set unchanged; and if the constraints on encoding bit rate and computation resource at the server are not satisfied after this element is added, then keeping the local optimal solution set unchanged, and removing this element from the search set;

(4) determination: if the remaining search set is not an empty set, then adding 1 to the search step count and returning back to iterative search of step (2); otherwise, stopping the iteration, and outputting the current local optimal solution set as an optimal result.

Preferably, in Step 3, the dynamic adaptive streaming media technology encodes any original video file into a plurality of video versions with different bit rates; and the optimal video version set is encoded and obtained by the server using the dynamic adaptive streaming media technology and adopting an encoding parameter of each optimal version of each video determined in Step 2.

In another aspect, the disclosure provides a system for bit rate control and version selection for a dynamic adaptive streaming media. The system comprises:

a video model extraction module for extracting first several frames of each original video to obtain an encoding complexity-bit rate-distortion model for each original video;

a bit rate control and version selection module for establishing an optimization problem of encoding bit rate control and version selection for a dynamic adaptive video streaming media utilizing a full set consisting of different versions of each video obtained by encoding at the server, the encoding complexity-bit rate-distortion model for each original video obtained in the video model extraction module, constraints on an encoding bit rate and a computing resource of the server, network connection conditions of users and a video-on-demand probability distribution, and obtaining an encoding parameter of each optimal version of each video by using the bit rate control and version selection method for the optimal version set;

a video version encoding module for encoding each original video into a plurality of video versions with different bit rates by using a dynamic adaptive streaming media encoding technology and adopting an encoding parameter of each optimal version of each video obtained in the bit rate control and version selection module, and outputting to obtain the optimal video version set.

Compared to the existing techniques, the disclosure has the beneficial effects:

In order to meet the need of a dynamic adaptive streaming media technology, the disclosure provides a method for rapidly and efficiently determining the bit rate control and version selection of the optimal versions under the conditions that encoding bit rate and computation resources of the server are limited, thereby improving the utilization efficiency of bit rates and computation resources of video contents encoded at the server, and provide better video service quality for users.

BRIEF DESCRIPTION OF THE DRAWINGS

Through reading the detailed description of non-limiting embodiments with reference to the following drawings, other features, purposes and advantages of the disclosure will become clearer.

DETAILED DESCRIPTION OF PREFERRED EMBODIMENTS

The disclosure will be described in combination with embodiments. The following embodiments will help those of ordinary skill in the art further understand but do not limit the disclosure in any form. It should be noted that, several variations and modifications can also be made by those of ordinary skill in the art without departing from the concept of the disclosure. These variations and modifications belong to the protection scope of the disclosure.

Figure 1:
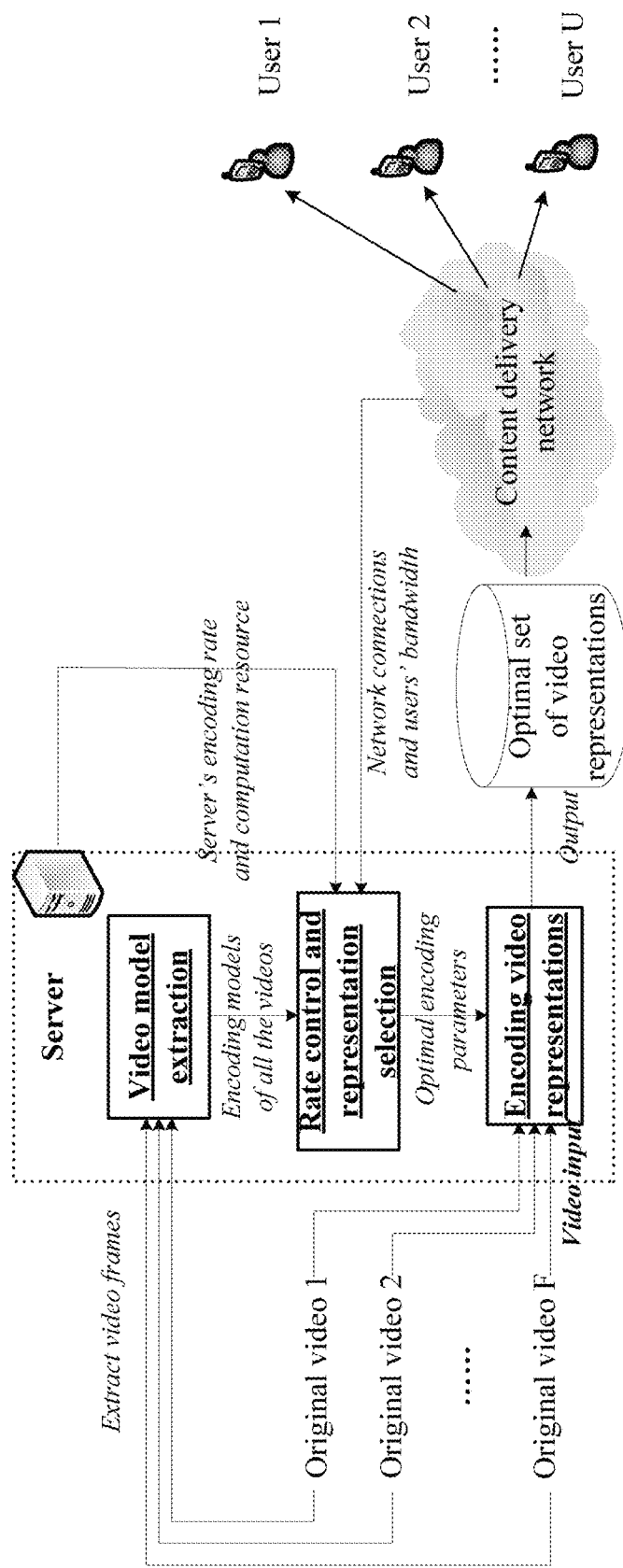
FIG. 1 is a system principle and method flowchart according to an embodiment of the disclosure.

As illustrated in FIG. 1, a system for achieving bit rate control and version selection for a dynamic adaptive video streaming media includes a video model extraction module, a bit rate control and version selection module and a video version encoding module which are arranged in the server.

The video model extraction module is used for extracting first several frames of each original video to obtain the encodings complexity-bit rate-distortion models of each original video.

The bit rate control and version selection module is used for establishing an optimization problem of encoding bit rate control and version selection for a dynamic adaptive video streaming media utilizing a full set consisting of different versions of each video obtained by encoding at the server, the encoding complexity-bit rate-distortion model for each original video obtained in the video model extraction module, constraints on an encoding bit rate and a computing resource of the server, network connection conditions of users and a video-on-demand probability distribution, and obtaining an encoding parameter of each optimal version of each video by using a bit rate control and version selection method for an optimal version set.

The video version encoding module is used for encoding each original video into a plurality of video versions with different bit rates by using a dynamic adaptive streaming media encoding technology and adopting an encoding parameter of an optimal version of each video that is obtained in the bit rate control and version selection module, and outputting to obtain the optimal video version set.

As illustrated in FIG. 1, a content distribution network of the dynamic adaptive streaming media is analyzed by virtue of examples. Assume that the server has F original video files (F is any positive integer greater than 2), which are denoted as a video file set $\mathcal{F} = \{1, 2, \ldots, F\}$. A dynamic adaptive streaming media technology is used to encode any video file $f \in \mathcal{F}$ into M video versions with different bit rates (M is any positive integer greater than 2), which are denoted as a video version set $\mathcal{M}$. Each video version $m \in \mathcal{M}$ corresponds to a pair of specific encoding parameters $(\lambda_m, Q_m)$, wherein $\lambda_m$ represents a search range of the video version m in a motion estimation module when encoding, and $Q_m$ represents a quantization step size of the video version m in a quantization module when encoding. The encoding bit rate of the $m$-th video version of the video file f is denoted as $R_f(\lambda_m, Q_m)$, and the video version set $\mathcal{M}$ is arranged in a descending order of the encoding bit rates, i.e., $R_f(\lambda_j,Q_j) > R_f(\lambda_j,Q_j)$, $\forall 1 \le i < j \le M$, Accordingly, Then, a basis set $V = \{u_{f,m} | \forall f \in \mathcal{F}, \forall m \in \mathcal{M}\}$ can be defined to represent a full set consisting of different versions of each video obtained by encoding at the server, wherein an element $u_{f,m}$ represents the $m$-th video version of the video file f encoded and outputted by the server.

U users randomly distributed in a network are denoted as a user set $\mathcal{U} = \{1, 2, \ldots, U\}$. A user can propose a video-on-demand request to the server, and can select a video version with a bit rate less than $B_u$ to download from the server according to its link bandwidth $B_u$. For each user $u \in \mathcal{U}$, a set of all the versions of all the videos downloaded by the link bandwidth $B_u$ is denoted as $\Omega_u = \{v_{f,m} \in V | R_f(\lambda_m,Q_m) \le B_u, \forall f \in \mathcal{F}, \forall m \in \mathcal{M}\}$.

Based on the above description, in an embodiment, a method for bit rate control and version selection for a dynamic adaptive video streaming media includes the following steps:

1. Video Model Extraction

The server extracts the first K (K is any positive integer greater than 2) frames of each original video $f \in \mathcal{F}$. Through an encoding and parameter analysis process, the encoding complexity, encoding bit rate and encoding distortion of a video version $m \in \mathcal{M}$ are expressed as functions of encoding parameters and $(\lambda_m,Q_m)$, denoted as $C_f(\lambda_m,Q_m)$, $R_f(\lambda_m,Q_m)$ and $D_f(\lambda_m,Q_m)$, respectively. This step can be accomplished through the video model extraction module as shown in FIG. 1.

2. Bit Rate Control and Version Selection

This step can be accomplished through the bit rate control and version selection module as shown in FIG. 1.

The optimization problem of encoding bit rate control and version selection for the dynamic adaptive video streaming media is established as follows (wherein the meaning of each parameter can be found in the context).

Optimization objective:

$$\max_{A \subseteq V} D(A) = \sum_{u \in U} \overline{D}_u(A);$$

Constraints:

$$\sum_{f=1}^{F} \sum_{m=1}^{M} 1|_{u_{f,m} \in A} \cdot R_f(\lambda_m, Q_m) \le R_{max},$$

$$\sum_{f=1}^{F} \sum_{m=1}^{M} 1|_{u_{f,m} \in A} \cdot C_f(\lambda_m, Q_m) \le C_{max}.$$

Wherein, a optimization variable is $A$, which represents a set consisting of the actually encoded and outputted versions of all the videos. Specifically, a certain element $v_{f,m} \in A$ represents that the $m$-th video version of the video file f is encoded and outputted by the server.

The optimization objective is to maximize a sum $D(A) = \sum_{u \in U} \overline{D}_u(A)$ of expected video distortion reductions of all the users, wherein a set V of different versions of each video obtained by encoding at the server is the basis set of the optimization problem; when a user requests the video file f, a highest-bit-rate version of this video is selected from a set $A \cap \Omega_u$ to be watched; thus, given that the probability of user u requesting video file f is $P_{u,f}$, $\overline{D}_u(A)$ is then denoted as the expected video distortion reduction when user u watches the video representations from the actual output video representation set encoded by the server A, namely, $$\overline{D}_u(A) = \sum_{f=1}^{F} \sum_{m=1}^{M} \left[\prod_{j=1}^{m-1} (1 - 1|u_{f,f} \in (A \cap \Omega_u))\right] \cdot$$

$$1|u_{f,m} \in (A \cap \Omega_u) \cdot P_{u,f} \cdot [D_{max} - D_f(\lambda_m \cdot Q_m)]$$

In the formula, a value of an exponential function $1|u_{f,j} \in (A \cap \Omega_u)$ is 1 when $u_{f,j} \in (A \cap \Omega_u)$, and is 0 when $u_{f,j} \notin (A \cap \Omega_u)$; $D_{max}$ represents the maximum distortion constant when a video cannot be decoded; $D_f(\lambda_m,Q_m)$ represents encoding distortion of the M-th video version of the video file f; $D_{max} - D_f(\lambda_m,Q_m)$ represents a video distortion reduction when the user successfully decodes the M-th video version of the video file f.

the constraints are an encoding bit rate constraint of a server, namely, it is required that a sum of bit rates of all the video versions does not exceed a maximum bit rate resource $R_{max}$ of the server; and a computation constraint of the server, namely, it is required that a sum of encoding complexity of all the video versions does not exceed a maximum computation resource $C_{max}$ of the server.

Figure 2:
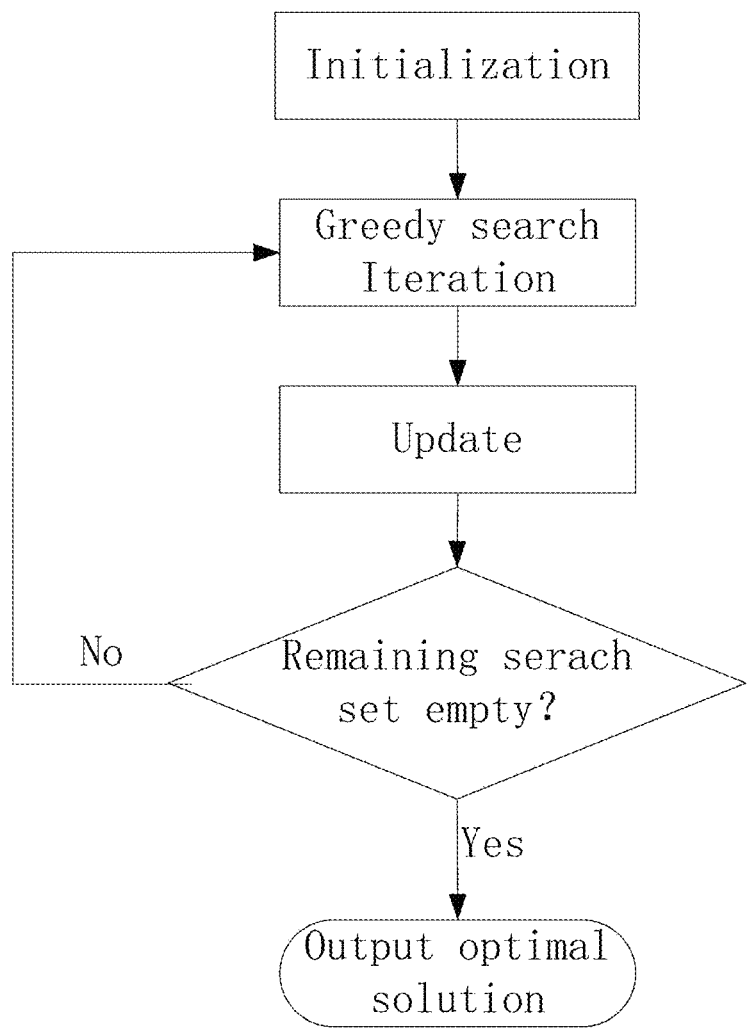
FIG. 2 is a flowchart of a method for encoding parameter selection according to an embodiment of the disclosure.

As illustrated in FIG. 2, a high-cost-benefit greedy algorithm with a polynomial time complexity and high approximation performance is proposed so as to rapidly and efficiently achieve the bit rate control and version selection of the optimal video version set.

The method for bit rate control and version selection for the optimal version set is implemented as follows (wherein the meaning of each parameter can be found in the context):

(1) initialization: setting an initial local optimal solution set $A^0 = \emptyset$, an initial search set $v^0 = v$, and an initial search step count $t=1$;

(2) iterative search ($t=1,2,3\ldots$): searching over the remaining search set $v^{t-1} \backslash A^{t-1}$ (i.e., $v^{t-1} - A^{t-1}$, the complement set of the local optimal solution set $A^{t-1}$ as to the search set $v^{t-1}$) for an element $u_{f,m_t}$ that maximizes the weighted sum of ratios of a boundary increment $(D(A^{t-1} \cup \{u_{f,m_t}\}) - D(A^{t-1}))$ to a bit rate cost $(R_f(\lambda_m,Q_m))$ and that to a complexity cost $(C_f(\lambda_m,Q_m))$ according to the existing local optimal solution set $A^{t-1}$, i.e., $$u_{f_t,m_t} = \arg \max_{u_{f,m} \in V^{t-1} \backslash A^{t-1}} \omega \cdot \frac{D(A^{t-1} \cup \{u_{f,m}\}) - D(A^{t-1})}{R_f(\lambda_m, Q_m)} +$$

$$(1 - \omega) \cdot \frac{D(A^{t-1} \cup \{u_{f,m}\}) - D(A^{t-1})}{C_f(\lambda_m, Q_m)}$$

wherein, in the above formula, an element $u_{f,m}$ represents the M-th video version of the video file f encoded and outputted at the server, an element $u_{f,m_t}$ represents an element maximizing a weighted sum of ratios of a boundary increment searched in the t-th search step to a bit rate cost and to a complexity cost, the weight is $\omega$, $R_f(\lambda_m,Q_m)$ represents the encoding bit rate of the $m$-th video version of the video file f, and $C_f(\lambda_m,Q_m)$ represents the encoding complexity of the $m$-th video version of the video file f;

(3) updating: if the constraints on encoding bit rate and computation resource of the server are still satisfied after the element $u_{f,m_l}$ is added, namely, $$\sum_{f=1}^{F}\sum_{m=1}^{M} 1\,|\,u_{f,m} \in \left(A^{t-1} \cup \{u_{f_t,m_t}\}\right) \cdot R_f(\lambda_m, Q_m) \leq R_{max},$$

$$\sum_{f=1}^{F}\sum_{m=1}^{M} 1\,|\,u_{f,m} \in \left(A^{t-1} \cup \{u_{f_t,m_t}\}\right) \cdot C_f(\lambda_m, Q_m) \leq C_{max},$$

then adding this element $u_{f,m_l}$ into the local optimal solution set, and keeping the search set unchanged, namely, $A^t = A^{t-1} \cup \{u_{f,m_l}\}$ and $v^t = v^{t-1}$; and if the constraints on encoding bit rate and computation resource of the server cannot be satisfied after this element is added, then keeping the local optimal solution set unchanged, and removing this element from the search set, namely, $A^t = A^{t-1}$ and $v^t = v^{t-1} \setminus \{u_{f,m_l}\}$;

(4) determination: if the remaining search set $v^t \setminus A^t$ is not an empty set, then t=t+1 and returning back to iterative search of (2); otherwise, stopping the iteration, and outputting the current local optimal solution set $A^t$ as the optimal result $A^*$.

3. Video Version Encoding

This step can be accomplished by adopting the video version encoding module as shown in FIG. 1.

Corresponding to the optimal result $A^*$ obtained in Step 2, the server further uses the dynamic adaptive streaming media technology to encode each original video into a plurality of video versions with different bit rates, and outputting the optimal video version set.

Specifically, $\forall u_{f,m} \in A^*$, the server will adopt the encoding parameter $(\lambda_m, Q_m)$ to actually encode the original video f, thereby obtaining the M-th bit rate version of the video f;

$\forall u_{f,m} \notin A^*$, the server will not adopt the encoding parameter $(\lambda_m, Q_m)$ to actually encode the original video f.

Figure 3:
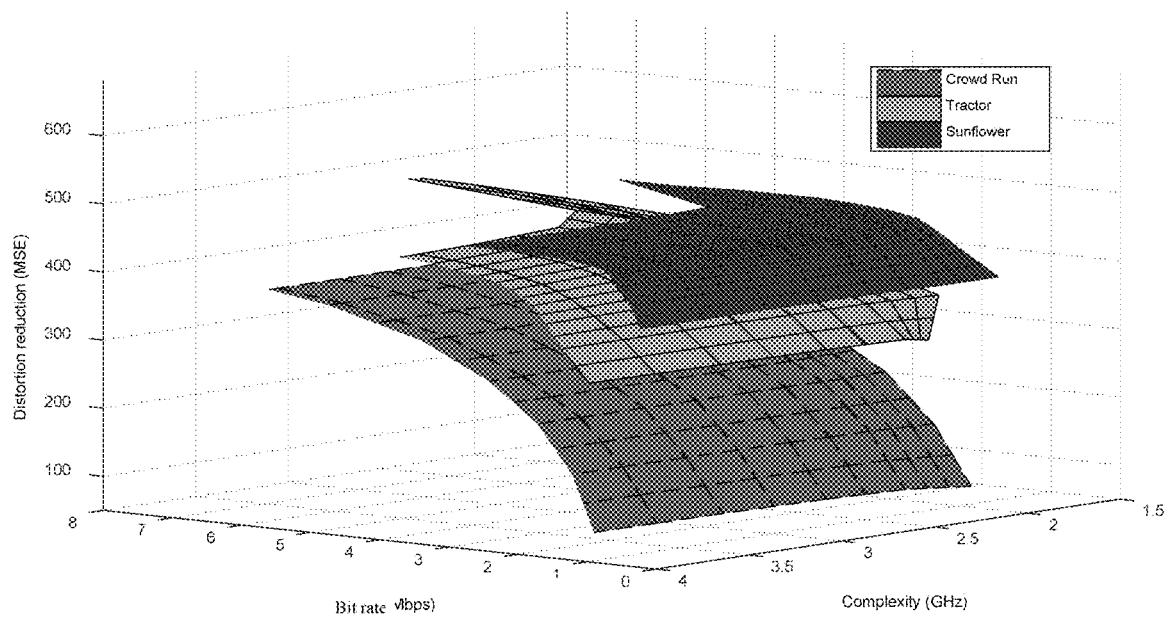
FIG. 3 is a diagram of an encoding complexity-bit rate-distortion performance of a video according to an embodiment of the disclosure.

FIG. 3 shows an encoding complexity-bit rate-distortion performance curved surface of three specific video files (Crowd Run, Tractor and Sunflower) at the server, wherein the spatial resolution of the three videos is 1080 p (1920×1080) and an encoding frame bit rate is 30 frames per second.

Figure 4:
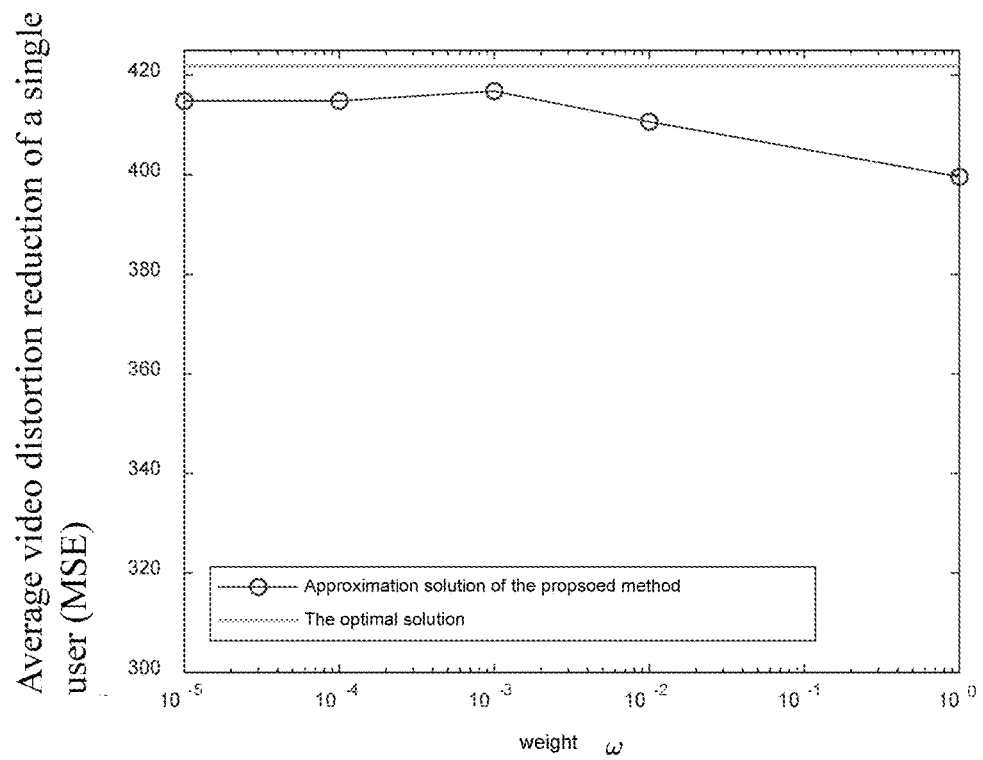
FIG. 4 is a diagram showing performance of a method for bit rate control and version selection of an optimal video version according to an embodiment of the disclosure.

FIG. 4 shows change of the video distortion performance adopting the method for bit rate control and version selection for the optimal video version set along with change of weight $\omega$ under the setting of server bit rate constraint $R_{max}$=30 Mbps and computation resource constraint $C_{max}$=30 GHz, wherein the maximal video distortion is $D_{max}$=500.

In order to meet the need of multi-bit-rate version transmission of a dynamic adaptive video streaming media and differentiated bandwidth condition and video-on-demand requirement of a heterogeneous network user, an optimal version bit rate control and version selection problem under the condition that the encoding bit rate and computation resource of the server are limited is established, and an efficient and rapid bit rate control and version selection method for the optimal version set is correspondingly provided, thereby achieving maximization of the overall quality of the video downloaded and watched by the user. The disclosure improves the utilization efficiency of the rate and computation resources for video encoding at the server, thereby providing a better video service quality for the users.

Embodiments of the disclosure are described as above. It should be understood that the disclosure is not limited to the above embodiments, and a variety of variations and modifications can be made by those of ordinary skill in the art within the scope of the claims, which does not affect the claimed subject matter.

We claim:

1. A method for bit rate control and version selection for a dynamic adaptive video streaming media, comprising the following steps:

Step 1: video model extraction extracting first several frames of each original video to obtain an encoding complexity-bit rate-distortion model for each original video, Step 2: bit rate control and version selection establishing an optimization problem of encoding bit rate control and version selection for the dynamic adaptive video streaming media according to a full set consisting of different versions of each video, the encoding complexity-bit rate-distortion model for each original video obtained in Step 1, constraints on an encoding bit rate and a computation resource of a server, network connection conditions of users and a video-on-demand probability distribution, and obtaining an encoding parameter of each optimal version of each video by using a bit rate control and version selection method for an optimal version set;

Step 3: video version encoding encoding each original video into a plurality of video versions with different bit rates by using a dynamic adaptive streaming media encoding technology and adopting the encoding parameter of each optimal version of each video obtained in Step 2, and outputting to obtain an optimal video version set.

2. The method according to claim 1, wherein, in Step 1, the number of the first several frames is any positive integer that is greater than two.

3. The method according to claim 1, wherein, in Step 1, the original videos present different encoding complexity-bit rate-distortion performances due to different contents; and the encoding complexity-bit rate-distortion model expresses an encoding complexity, a bit rate and a distortion as a function of specific encoding parameters.

4. The method according to claim 1, wherein, in Step 2, the optimization problem of encoding bit rate control and version selection for the dynamic adaptive video streaming media is obtained by using a network utility maximization modelling method.

5. The method according to claim 4, wherein, the establishing optimization problem of encoding bit rate control and version selection for the dynamic adaptive video streaming media comprises:

optimization objective:

$$\max_{A \subseteq V} D(A) = \sum_{u \in U} \overline{D}_u(A),$$

constraints:

$$\sum_{f=1}^{F}\sum_{m=1}^{M} 1\,|_{u_{f,m} \in A} \cdot R_f(\lambda_m, Q_m) \leq R_{max},$$

-continued $$\sum_{f=1}^{F}\sum_{m=1}^{M} 1|_{u_{f,m} \in A} \cdot C_f(\lambda_m, Q_m) \le C_{max},$$

wherein, $\mathcal{F} = \{1, 2, \ldots, F\}$ represents a video file set; $\mathcal{M} = \{1, 2, \ldots, M\}$ represents a video version set; $\mathcal{U} = \{1, 2, \ldots, U\}$ represents a user set; F, M, U are any positive integers greater than two; $\lambda_m$ denotes a search range of a video version m in motion estimation when encoding; $Q_m$ denotes a quantization step size of the video version m in quantization when encoding: $R_f(\lambda_m, Q_m)$ denotes the encoding bit rate of the $m$-th video version of a video file f; $C_f(\lambda_m, Q_m)$ denotes the encoding complexity of the $m$-th video version of video file f; a basis set $V = \{u_{f,m} | \forall f \in \mathcal{F}, \forall m \in \mathcal{M}\}$ is defined to denote a full set consisting of different versions of each video obtained by encoding at the server, wherein an element $v_{f,m}$ denotes that the server encodes and outputs the $m$-th video version of the video file f; for each user $U \in \mathcal{U}$, a set of all the versions of all the videos that can be downloaded through its link bandwidth $B_u$ is denoted as $\Omega_u = \{v_{f,m} \in V | R_f(\lambda_m, Q_m) \le B_u, \forall f \in \mathcal{F}, \forall m \in \mathcal{M}\}$;

an optimization variable is: $\mathcal{A}$, which represents a set consisting of actually encoded and output video versions; specifically, a certain element $v_{f,m} \in \mathcal{A}$ represents that the $m$-th video version of the video file f is encoded and outputted by the server;

an optimization objective is to maximize a sum $D(\mathcal{A}) = \Sigma_{u \in U} \overline{D}_u(\mathcal{A})$ of expected video distortion reductions of all the users; wherein a set V of different versions of each original video obtained by encoding at the server is the basis set of the optimization problem; when a user requests the video file f, a highest-bit-rate version of this video is selected from a set $\mathcal{A} \cap \Omega_u$ to be watched; thus, given that the probability of user $\mathcal{U}$ requesting video file f is $P_{u,f}$, $\overline{D}_u(\mathcal{A})$ is then denoted as the expected video distortion reduction when user U watches the video representations from the actual output video representation set encoded by the server $\mathcal{A}$ namely, $$\overline{D}_u(A) = \sum_{f=1}^{F} \sum_{m=1}^{M} \left[ \prod_{j=1}^{m-1} (1 - |u_{f,j} \in (A \cap \Omega_u)) \right] \cdot$$

$$1 | u_{f,m} \in (A \cap \Omega_u) \cdot P_{u,f} \cdot [D_{max} - D_f(\lambda_m \cdot Q_m)]$$

in the formula, a value of an exponential function $1|u_{f,j} \in (A \cap \Omega_u)$ is 1 when $u_{f,j} \in (A \cap \Omega_u)$, and is 0 when $u_{f,j} \notin (A \cap \Omega_u)$; $D_{max}$ represents a maximum distortion constant when a video cannot be decoded; $D_f(\lambda_m, Q_m)$ represents encoding distortion of the $m$-th video version of the video file f; $D_{max} - D_f(\lambda_m, Q_m)$ represents a video distortion reduction when the user successfully decodes the $m$-th video version of the video file f;

the constraints are an encoding bit rate constraint of the server, namely, it is required that the sum of bit rates of all the video versions does not exceed a maximum bit rate resource $R_{max}$ of the server; and a computation constraint of the server, namely, it is required that the sum of encoding complexity of all the video versions does not exceed a maximum computation resource $C_{max}$ of the server.

6. The method according to claim 1, wherein, in Step 2, the bit rate control and version selection method for the optimal version set specifies that a high-cost-benefit greedy algorithm with polynomial time complexity and high approximation optimization performance is adopted when encoding parameters of an optimal version are determined for each original video so as to rapidly and efficiently achieve the bit rate control and version selection of the optimal version of each original video.

7. The method according to claim 6, wherein, the bit rate control and version selection method for the optimal version set comprises the following steps:
    (1) initialization: setting an initial local optimal solution set as an empty set, an initial search set as a full set of different versions of each video obtained by encoding at the server and an initial step count as 1;
    (2) iterative search: searching over the remaining search set for an element that maximizes a weighted sum of the ratio of a boundary increment to bit rate cost and the ratio of a boundary increment to complexity cost according to the existing local optimal solution set, wherein the remaining search set is a complement set of the local optimal solution as to the search set, and an element in the remaining search set corresponds to a certain bit rate version obtained by encoding a certain video;
    (3) updating: if the constraints on encoding bit rate and computation resource at the server are still satisfied after the element searched in step (2) is added, then adding this element into the local optimal solution set, and keeping the search set unchanged; if the constraints on encoding bit rate and computation resource at the server are not satisfied after this element is added, then keeping the local optimal solution set unchanged, and removing this element from the search set;
    (4) determination: if the remaining search set is not an empty set, then adding 1 to the search step count and returning back to the iterative search of step (2); otherwise, stopping the iteration, and outputting the current local optimal solution set as an optimal result.

8. The method according to claim 1, wherein, in Step 3, the dynamic adaptive streaming media encoding technology encodes any original video file into a plurality of video versions with different bit rates.

9. A system for bit rate control and version selection for a dynamic adaptive video streaming media for implementing the method according to claim 1, comprising:
    a video model extraction module for extracting first several frames of each original video to obtain an encoding complexity-bit rate-distortion model for each original video;
    a bit rate control and version selection module for establishing an optimization problem of encoding bit rate control and version selection for the dynamic adaptive video streaming media according to a full set consisting of different versions of each video obtained by encoding at the server, the encoding complexity-bit rate-distortion model for each original video obtained in the video model extraction module, constraints on an encoding bit rate and a computing resource of the server, network connection conditions of users and a video-on-demand probability distribution, and obtaining an encoding parameter of each optimal version of each video by using a bit rate control and version selection method for an optimal version set;

a video version encoding module for encoding each original video into a plurality of video versions with different bit rates by using a dynamic adaptive streaming media encoding technology and adopting the encoding parameter of each optimal version of each video obtained in the bit rate control and version selection module, and outputting to obtain an optimal video version set.

* * * * *